(12) United States Patent
Drzymala et al.

(10) Patent No.: US 9,033,236 B2
(45) Date of Patent: May 19, 2015

(54) POINT-OF-TRANSACTION WORKSTATION FOR AND METHOD OF IMAGING INDICIA OVER FULL COVERAGE SCAN ZONE OCCUPIED BY UNSKEWED SUBFIELDS OF VIEW

(75) Inventors: Mark Drzymala, Commack, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 639 days.

(21) Appl. No.: 13/094,081

(22) Filed: Apr. 26, 2011

(65) Prior Publication Data

US 2012/0273572 A1 Nov. 1, 2012

(51) Int. Cl.
- *G06K 7/10* (2006.01)
- *G06K 15/12* (2006.01)
- *G06K 7/14* (2006.01)
- *G02B 5/08* (2006.01)
- *G02B 26/00* (2006.01)

(52) U.S. Cl.
CPC .......... *G06K 7/10722* (2013.01); *G06K 7/1096* (2013.01)

(58) Field of Classification Search
CPC G06K 7/10702; G06K 7/10881; G06K 9/209
USPC ............... 235/435, 439, 454, 462.01, 462.11, 235/462.41, 462.14, 462.4, 462.36, 462.37, 235/462.38
See application file for complete search history.

(56) References Cited

U.S. PATENT DOCUMENTS

| | | | | |
|---|---|---|---|---|
| 4,743,773 A | * | 5/1988 | Katana et al. | 235/462.07 |
| 4,978,860 A | * | 12/1990 | Bayley et al. | 250/568 |
| 5,512,744 A | * | 4/1996 | Scofield et al. | 250/234 |
| 5,811,828 A | * | 9/1998 | Laser | 250/566 |
| 6,169,614 B1 | * | 1/2001 | Whitcomb et al. | 359/15 |
| 6,259,545 B1 | * | 7/2001 | Whitcomb et al. | 359/199.1 |
| 6,547,144 B1 | * | 4/2003 | Dickson et al. | 235/462.34 |
| 6,669,093 B1 | * | 12/2003 | Meyerson et al. | 235/472.01 |
| 7,051,922 B2 | * | 5/2006 | Check et al. | 235/462.32 |
| 7,191,947 B2 | * | 3/2007 | Kahn et al. | 235/462.41 |
| 7,748,631 B2 | | 7/2010 | Patel et al. | |
| 7,780,086 B2 | * | 8/2010 | Barkan et al. | 235/462.32 |
| 2002/0139853 A1 | * | 10/2002 | Tsikos et al. | 235/462.01 |
| 2002/0139856 A1 | * | 10/2002 | Barkan | 235/462.4 |
| 2005/0116040 A1 | * | 6/2005 | Zhu et al. | 235/462.31 |
| 2005/0116043 A1 | * | 6/2005 | Zhu et al. | 235/462.45 |
| 2006/0022051 A1 | * | 2/2006 | Patel et al. | 235/462.14 |
| 2006/0255147 A1 | * | 11/2006 | Havens et al. | 235/462.21 |

(Continued)

OTHER PUBLICATIONS

International Search Report and Written Opinion for International Patent Application No. PCT/US2012/034144 issued on Aug. 30, 2012.

*Primary Examiner* — Daniel Walsh
(74) *Attorney, Agent, or Firm* — Nong-Qianq Fan

(57) ABSTRACT

A bi-optical, dual window, point-of-transaction workstation images indicia associated with multi-sided products over a full coverage scan zone by splitting each field of view of only two imagers into three subfields that pass through each window and fill the scan zone and minimize dead areas therein. Twisting of the subfields relative to the windows is minimized so that the subfields fit fully with minimal clipping through each window. Splitting of each field of view is remotely performed well away from each imager. The imagers have lens assemblies of substantially the same optical power and are spaced from their respective windows by substantially the same distance.

20 Claims, 12 Drawing Sheets

(56) References Cited

U.S. PATENT DOCUMENTS

| | | | |
|---|---|---|---|
| 2007/0272841 A1* | 11/2007 | Wiklof | 250/234 |
| 2009/0020611 A1* | 1/2009 | Sackett et al. | 235/462.08 |
| 2009/0026271 A1* | 1/2009 | Drzymala et al. | 235/462.42 |
| 2009/0188980 A1* | 7/2009 | Bobba et al. | 235/462.39 |
| 2010/0102129 A1* | 4/2010 | Drzymala et al. | 235/462.42 |
| 2010/0127082 A1 | 5/2010 | Drzymala | |
| 2010/0163622 A1* | 7/2010 | Olmstead | 235/454 |
| 2010/0163626 A1* | 7/2010 | Olmstead | 235/462.41 |
| 2010/0252633 A1* | 10/2010 | Barkan et al. | 235/462.24 |
| 2011/0127333 A1* | 6/2011 | Veksland et al. | 235/462.24 |
| 2011/0233278 A1* | 9/2011 | Patel et al. | 235/454 |
| 2012/0118962 A1* | 5/2012 | Barkan et al. | 235/454 |
| 2012/0118963 A1* | 5/2012 | Drzymala et al. | 235/454 |
| 2012/0273572 A1* | 11/2012 | Drzymala et al. | 235/454 |
| 2013/0087617 A1* | 4/2013 | Drzymala et al. | 235/454 |
| 2013/0175341 A1* | 7/2013 | Kearney et al. | 235/440 |

* cited by examiner

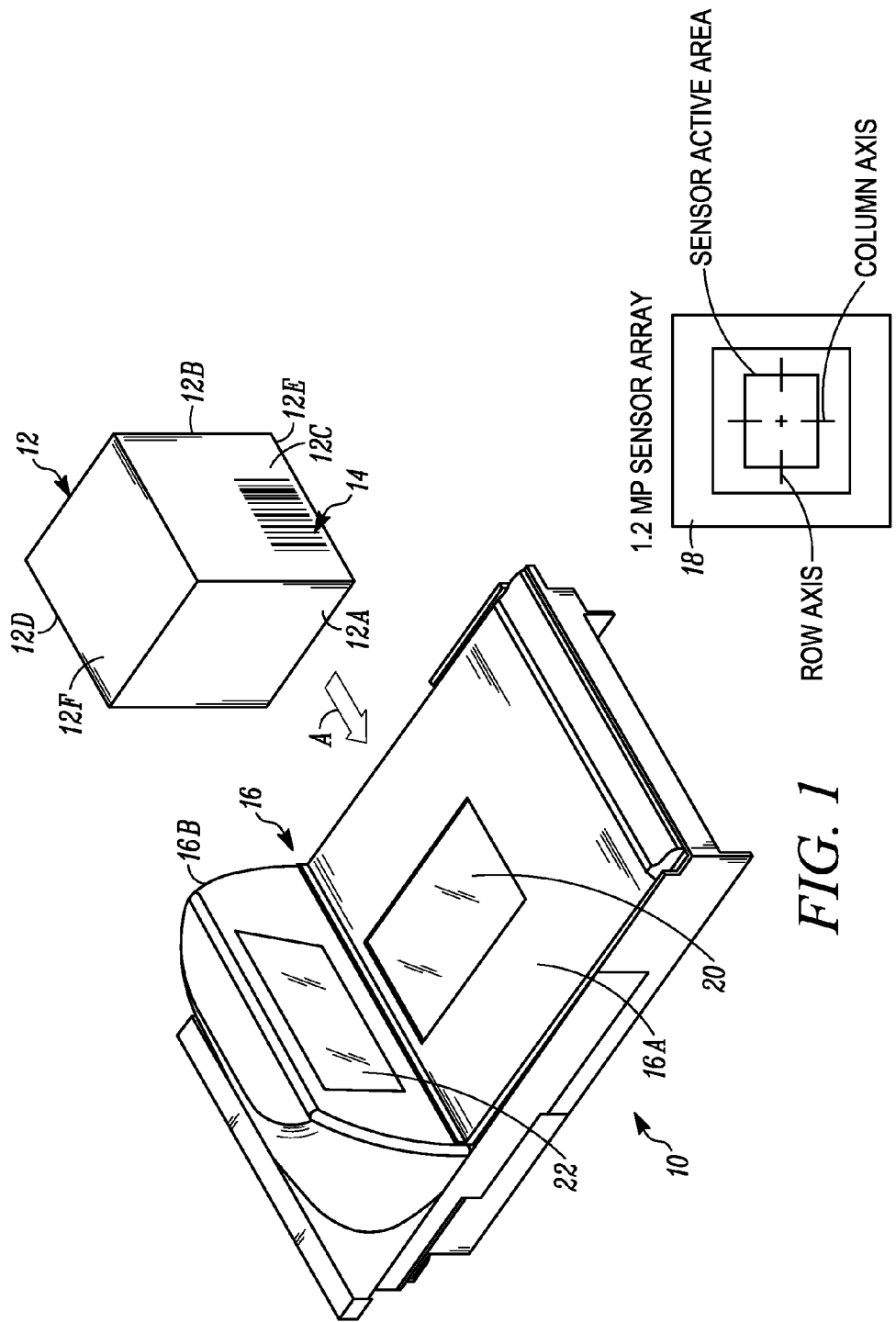

POINT-OF-TRANSACTION WORKSTATION FOR AND METHOD OF IMAGING INDICIA OVER FULL COVERAGE SCAN ZONE OCCUPIED BY UNSKEWED SUBFIELDS OF VIEW

BACKGROUND OF THE INVENTION

It is known to use laser-based and/or imager-based readers in a dual window or bi-optical workstation to electro-optically read indicia, such as bar code symbols, associated with three-dimensional products to be identified and processed, e.g., purchased, at a point-of-transaction workstation provided at a countertop of a checkout stand in supermarkets, warehouse clubs, department stores, and other kinds of retailers. The products are typically slid or moved by a user across, or presented to a central region of, a generally horizontal window that faces upwardly above the countertop and/or a generally vertical or upright window that rises above the countertop. When at least one laser scan line generated by a laser-based reader sweeps over a symbol and/or when return light from the symbol is captured over a field of view by a solid-state imager of an imager-based reader, the symbol is then processed, decoded and read, thereby identifying the product.

The symbol may be located low or high, or right to left, on the product, or anywhere in between, on any of six sides of the product. The symbol may be oriented in a "picket fence" orientation in which elongated parallel bars of a one-dimensional Universal Product Code (UPC) symbol are vertical, or in a "ladder" orientation in which the UPC symbol bars are horizontal, or at any orientation angle in between. The products may be held by the user at various tilt angles during their movement across, or presentation to, either window. The products may be positioned either in contact with, or held at a distance away from, either window during such movement or presentation. All these factors make the symbol location variable and difficult to predict in advance.

In such an environment, it is important that the readers at the workstation provide a full coverage scan zone above the horizontal window and in front of the upright window so that the scan zone extends down as close as possible to the countertop, and sufficiently high above the countertop, and as wide as possible across the width of the countertop. The scan zone projects into space away from the windows and grows in volume rapidly in order to cover symbols on products that are positioned not only on the windows, but also many inches therefrom. The scan zone must be large enough to read symbols positioned in any possible way across the entire volume of the scan zone and must not have any dead areas in which symbols are not covered and, therefore, cannot be read.

As advantageous as workstations with laser-based readers have been in processing transactions, workstations with imager-based readers, also known as imagers, are thought to offer improved reliability and have the added capability of reading indicia other than UPC symbols, such as two-dimensional or stacked or truncated symbols, as well as the capability of imaging non-symbol targets, such as receipts, driver's licenses, signatures, etc. It was initially thought that an all imager-based workstation would require about ten to twelve, or at least six, imagers in order to provide a full coverage scan zone to enable reliable reading of indicia that could be positioned anywhere on all six sides of a three-dimensional product. However, to bring the cost of the imager-based workstation down to an acceptable level, it is known to reduce the need for so many imagers by splitting the field of view of at least one imager into a plurality of subfields of view, each additional subfield serving to replace an additional imager.

However, such subfields of view, also known as light collection regions, produced by splitting the field of view in the known imager-based workstation do not fully occupy the scan zone. As a result, the scan zone does not have full coverage and has dead areas in which indicia cannot be read. Also, at least some of the subfields are twisted or skewed relative to the windows through which they pass. As a result, a peripheral portion of the twisted subfields is clipped and blocked by a workstation wall bounding the window. All these factors, of course, degrade reading performance and efficiency.

In addition, due in part to the differently positioned and differently sized windows, the known imagers are typically provided with imaging lens assemblies that have different optical powers and that are focused at different distances away from the windows. In the prior art, some of the twisted subfields diverge as they pass through the windows, thereby reducing resolution when imaging indicia that is approximately parallel to the windows (a common situation), because the projection of individual sensors on the indicia is also enlarged. If the indicia is being imaged by an outer subfield angled to the right or left of the workstation, then the projection of the sensors on the indicia is stretched to the right or left. If the indicia is being imaged through one window by a central subfield directed towards the opposite window, then the sensor projection is stretched at right angles to the stretch from the outer subfields. In other words, for each window, there are subfields that have a higher resolution along a left/right axis, and different subfields have a higher resolution along a perpendicular up/down axis.

Anamorphic optics in the prior art served to squash the subfield in the direction where the angled projection of the subfield through the windows would otherwise have stretched the subfield and the sensors, thereby modifying the resolution to the point where high density indicia could not be adequately resolved. Elimination of anamorphic optics in the imaging lens assemblies would reduce the cost of the workstation and increase manufacturing efficiency.

Also, the splitting of the field of view in the known imager-based workstation is performed by positioning an optical splitter very close to the imager. Since each subfield grows as the distance from the imager is increased, the positioning accuracy of a closely adjacent splitter is very critical in the prior art, thereby adding a labor-intensive and costly additional adjustment step to the manufacture process. In addition, since the imagers are focused at a distance (typically a few inches) beyond the respective window, the image of any indicia close to the imager is very blurred. When the optical splitter is positioned very close to the imager, the edges of the optical splitter are very blurred and unfocussed, and there is not a sharp delineation between the subfields being split. Since each split subfield is very small in spatial volume, this blur can actually cover a significant portion of each split subfield, thereby wasting precious sensors and reducing the number of sensors available to resolve indicia located in the scan zone.

SUMMARY OF THE INVENTION

This invention relates to a point-of-transaction workstation for electro-optically imaging indicia associated with multi-sided products. The indicia are preferably bar code symbols that are electro-optically read in order to identify products being purchased at the workstation. In a preferred embodiment, the workstation is a bi-optical or dual window workstation having a generally horizontal window supported by a housing and located in a generally horizontal plane, and an upright window, also supported by the housing, and located in a generally upright plane that intersects the generally horizontal plane. The upright plane may lie in a vertical plane, or be slightly rearwardly or forwardly inclined relative to the vertical plane. The products are passed by an operator or a customer through a scan zone, which occupies the space at and above the horizontal window, and also occupies the space at and in front of the upright window.

At least one solid-state imager, and preferably two solid-state imagers, one for, and associated with, each window, are supported by the housing. Preferably, both imagers are commonly mounted on a printed circuit board. Each imager has a sensor array of sensors (also known as pixels) with a field of view. Each imager preferably comprises a two-dimensional, charge coupled device (CCD) array, or a complementary metal oxide semiconductor (CMOS) array, of sensors of megapixel size, e.g., 1280 pixels wide×960 pixels high. The array of sensors is arranged along mutually perpendicular array axes, i.e., a row axis and a column axis. Each imager includes an imaging lens assembly for capturing return light from the indicia and for projecting the captured return light onto the sensor array. Each imager may include, or be associated with, an illuminator for illuminating the indicia with illumination light from illumination light sources, e.g., light emitting diodes (LEDs).

A controller or programmed microprocessor is operative for controlling each illuminator to illuminate the indicia, for controlling each imager to capture the illumination light returning from the indicia over an exposure time period or frame to produce electrical signals indicative of the indicia being read, and for processing the electrical signals to read the indicia, and to decode the indicia if the indicia is a symbol. Each illuminator is preferably only operative during the exposure time period. Each imager is controlled to capture the return light from the indicia during different exposure time periods to avoid interference between the illuminators.

In accordance with one aspect of this invention, an optical system is supported by the housing and is operative for directing the captured return light along an optical path from at least one of the windows to its associated imager, and for splitting the field of view of the imager into a plurality of subfields of view. The optical system has a plurality of fold minors each positioned in the optical path to fold the captured return light in at least one of the subfields of view about a respective mirror axis substantially parallel to one of the row or column axes projected onto the respective minor to resist skewing of the one subfield of view relative to the one window.

As mentioned above, at least some of the known subfields of the prior art are twisted or skewed relative to the windows through which they pass. As a result, peripheral portions of each twisted subfield are clipped and blocked by workstation walls bounding the windows. To minimize, if not substantially eliminate, such clipping, the fold minors that are located in the optical path of at least one of the subfields are deliberately positioned and oriented relative to the row or column axes of the imager. Specifically, each such fold minor has mutually orthogonal minor axes extending along the height and height of each minor. Each fold mirror is oriented such that one of its minor axes is substantially parallel to one of the row or column axes projected onto that minor. Thus, each fold minor folds the captured return light along its travel between the indicia and the imager so that the subfield passes unskewed through the window at a distance from, and generally parallel to, linear edges of the window. Thus, more of the unskewed subfield passes through, and more fully fits, the window.

In accordance with another aspect of this invention, the optical system includes a first optical splitter for splitting the field of view of one of the imagers into three subfields of view that pass through one of the windows, and a second optical splitter for splitting another field of view of another imager into another three subfields of view that pass through the other window. Thus, only two imagers are needed to produce six subfields. These six subfields provide optimum visibility of indicia on various sides of a product being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users. If a user should present a product in an unusual way, however, such as by positioning the indicia opposite one of the windows, a subfield will still be positioned to read that indicia.

In accordance with yet another aspect of this invention, at least one of the fold minors is located in the optical path between each imager and each optical splitter. In a preferred embodiment, each imager is spaced along the optical path at a predetermined distance, e.g., about 400 mm, away from its associated window, and each optical splitter is located at least one-fifth of the predetermined distance away from its associated imager. Thus, each optical splitter is positioned remotely from the imager. As described above, this remote positioning of the splitter relaxes the prior art requirement of high positioning accuracy and provides a sharper delineation between the subfields being split, thereby increasing the number of sensors available to resolve indicia located in the scan zone.

As previously mentioned, the windows are differently positioned and differently sized. By way of numerical example, the generally horizontal window in a conventional bi-optical workstation lies in a horizontal plane and measures about four inches in width by about six inches in length, while the generally upright window generally lies in a tilted plane and measures about six inches in width by about eight inches in length. This in part led to the prior art use of imaging lens assemblies with different optical powers and different focal points at different distances away from the windows.

Another aspect of this invention resides in providing both imaging lens assemblies of the two imagers with substantially the same optical power, and in spacing the imagers at substantially the same, long predetermined distance, e.g., about 400 mm, away from their associated windows. Achieving such a long optical path by the use of a plurality of the folded minors allows the use of a minimum number of sensors. The longer the optical path, the narrower the divergence angle of a subfield can be, while still achieving the required subfield size at the window. Since the divergence angle is narrow, the subfield does not grow quickly beyond the window, thereby extending the working range over which sensor resolution is adequate. In other words, if a shorter optical path inside the workstation were used, i.e., less than, for example, 400 mm, then either the subfield size at the window would be smaller, or the image resolution would degrade too rapidly beyond the window to achieve a practical working range.

Yet another feature of this invention resides in a method of processing products by electro-optically imaging indicia associated with the products. The method is performed by supporting at least one window by a housing, capturing return light from the indicia through the at least one window over a field of view of at least one solid-state imager having an array of sensors arranged along mutually perpendicular array axes, directing the captured return light along an optical path from the at least one window to the at least one imager, splitting the field of view of the at least one imager into a plurality of subfields of view, positioning each of a plurality of fold mirrors in the optical path to fold the captured return light in at least one of the subfields of view about a respective minor axis substantially parallel to one of the array axes projected onto the respective minor to resist skewing of the at least one subfield of view relative to the at least one window, controlling the at least one imager, and processing the captured return light in the at least one subfield of view.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a dual window, bi-optical, point-of-transaction workstation or imaging reader operative for reading indicia on a multi-sided product passing through the workstation by image capture in accordance with this invention;

FIG. 2 is a top plan view of a sensor array of an imager for use in the workstation of FIG. 1;

DETAILED DESCRIPTION OF THE PREFERRED EMBODIMENTS

Figure 3:
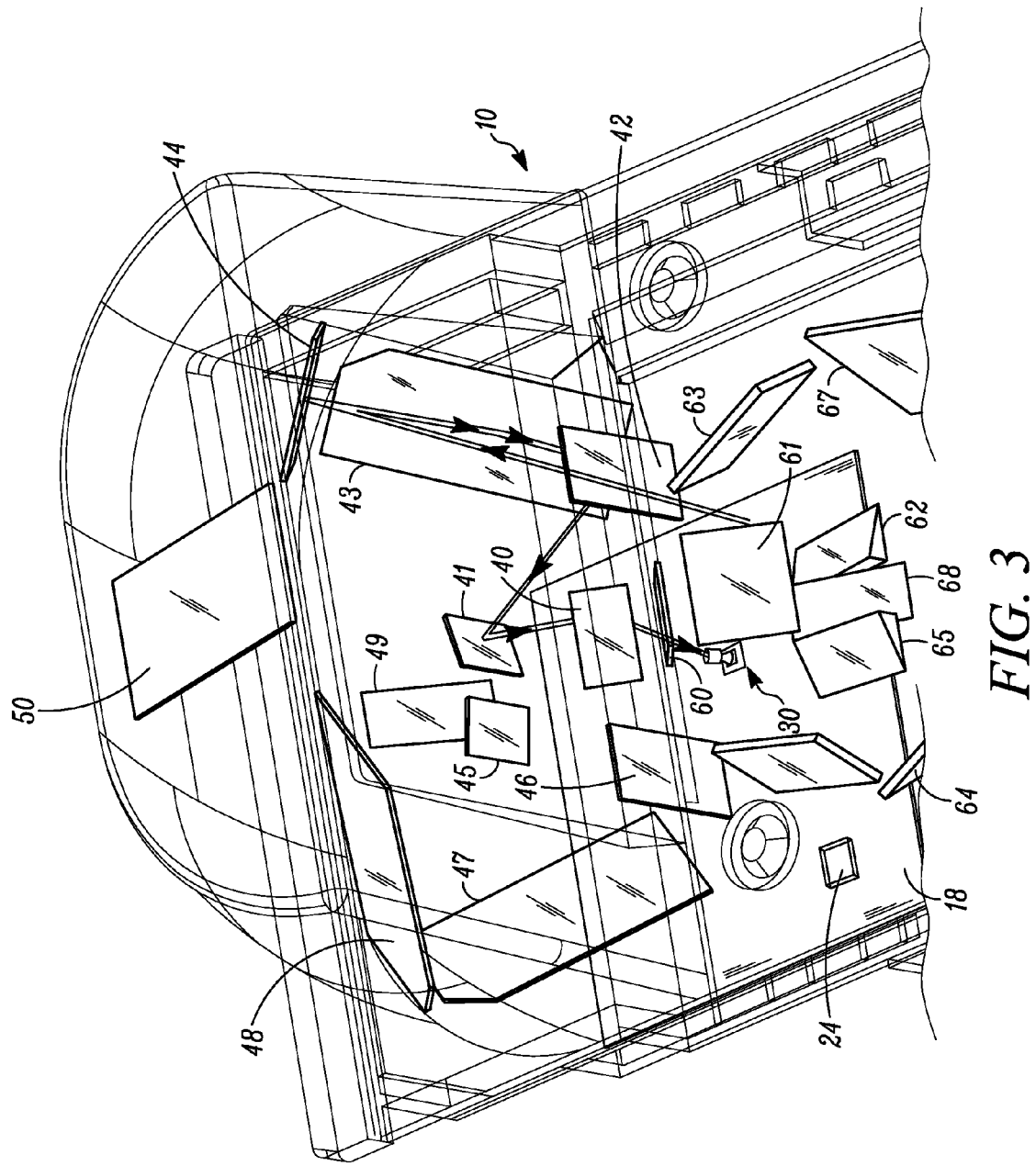
FIG. 3 is a broken-away, enlarged, perspective view of part of an optical system in the workstation of FIG. 1 diagrammatically depicting a folded optical path of an outer subfield of view of the imager of FIG. 2 for exit through an upright window.

FIG. 1 depicts a dual window, bi-optical, point-of-transaction workstation 10 for electro-optically imaging indicia 14 or targets, such as the illustrated UPC symbol described above, associated with multi-sided, three-dimensional products 12, and is typically used by retailers to process transactions involving the purchase of the products 12 bearing, or printed with, the identifying indicia 14. The workstation 10 includes a housing 16 having a generally horizontal window 20 located in a generally horizontal plane and supported by a horizontal housing portion 16A, and an upright window 22 located in a generally upright plane that intersects the generally horizontal plane and supported by a raised housing portion 16B. The upright plane may lie in a vertical plane, or be slightly rearwardly or forwardly inclined relative to the vertical plane. The upright window 22 is preferably recessed within its housing portion 16B to resist scratching. The products are passed by an operator or a customer through a scan zone, which occupies the space at and above the horizontal window 20, and also occupies the space at and in front of the uprig0ht window 22.

The indicia 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The indicia 14 could also be a non-symbol target, such as a personal check, a credit card, a debit card, a signature, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes. Thus, it can be determined if the operator is actually scanning the products, or passing them around the windows in an effort to bypass the windows and not charge the customer in a criminal practice known in retailing as "sweethearting".

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. As described above, the product 12 can be tilted or moved in other directions through the workstation 10.

Figure 4:
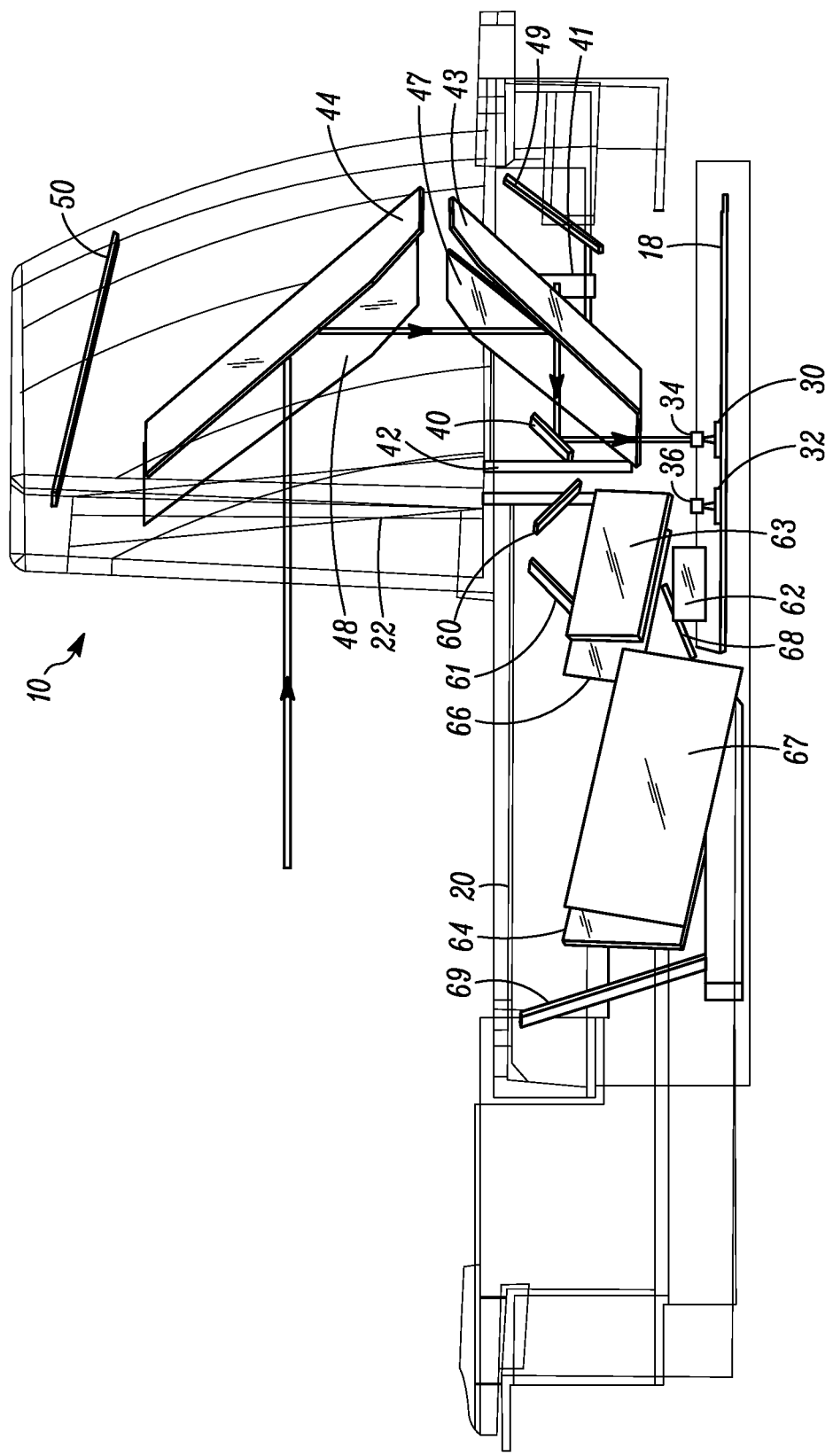
FIG. 4 is a side perspective, enlarged, view of the optical path of FIG. 3.

As best shown in FIGS. 3-4, a first solid-state imager 30 and a second solid-state imager 32 are commonly supported on a printed circuit board 18 within the housing. Each imager 30, 32 has a sensor array of sensors with a field of view diagrammatically shown by speckles in the various views. As described below, the field of view of the first imager 30 is directed out of the upright window 22; hence, the first imager 30 will be individually referred to as the vertical imager 30 for convenience. Similarly, the field of view of the second imager 32 is directed out of the horizontal window 20; hence, the second imager 32 will be individually referred to as the horizontal imager 32 for convenience.

Each imager 30, 32 preferably comprises a two-dimensional, charge coupled device (CCD) array, or a complementary metal oxide semiconductor (CMOS) array, of sensors of megapixel size, e.g., 1280 pixels wide×960 pixels high. In a preferred embodiment, the field of view of each imager 30, 32 measures about 15 degrees by 30 degrees. The arrays of both imagers 30, 32 extend along mutually perpendicular, row and column, directions. Thus, as shown in FIG. 2, each imager has a row axis and a column axis. Each imager 30, 32 includes an imaging lens assembly 34, 36 (see FIG. 4) for capturing return light from the indicia and for projecting the captured return light onto the respective sensor array. Each imager 30, 32 may include, or be associated with, an illuminator for illuminating the indicia with illumination light from one or more illumination light sources, e.g., surface-mounted, light emitting diodes (LEDs). The LEDs may either be closely adjacent the respective sensor array, or remote therefrom.

A controller 24 (see FIG. 3) is a programmed microprocessor that is also mounted on the board 18 and is operative for controlling each illuminator to illuminate the indicia 14, for controlling each imager 30, 32 to detect the illumination light returning from the indicia and captured by the imaging lens assemblies 34, 36 over an exposure time period or frame to produce electrical signals indicative of the indicia being read, and for processing the electrical signals to image the indicia 14, and to decode the indicia when the indicia is a symbol. Each illuminator is preferably only operative during the exposure time period. Each imager 30, 32 is preferably controlled to capture the return light from the indicia during different exposure time periods to avoid interference between the illuminators.

Each imager 30, 32 preferably has a global shutter so that the captured images will not be disturbed by motion of the indicia 14 relative to the window(s) during the exposure time period. A rolling or a mechanical shutter could also be employed. The indicia 14 can be presented or swiped at speeds up to around 100 inches per second across any part of either window. For an imager to be able to read an indicium that is moving rapidly, the indicium must be brightly illuminated by the illuminators so that a short exposure time can be used. Bright illumination light shining out of either window can be annoying or uncomfortable to the user, so the illumination light must not be directly viewable by the operator, or by a consumer standing nearby.

Figure 13:
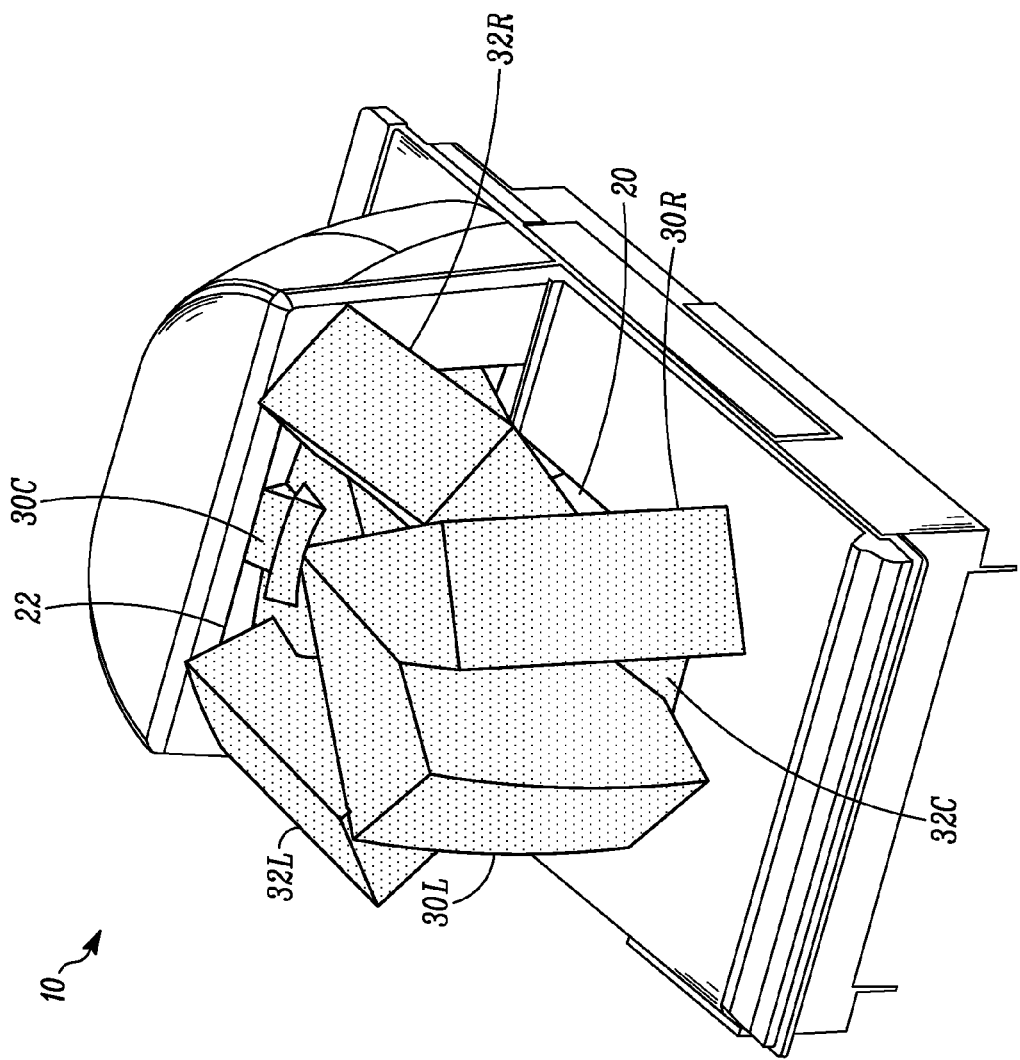
FIG. 13 is a perspective view of the workstation of FIG. 1 diagrammatically depicting all six subfields exteriorly of the windows.

In accordance with this invention, an optical system is supported by the housing 16 and is operative for directing the captured return light along a first folded optical path from the upright window 22 to the vertical imager 30, and along a second folded optical path from the horizontal window 20 to the horizontal imager 32. As described in more detail below, the optical system is further operative for splitting the field of view of the vertical imager 30 into a plurality of subfields of view, namely a center subfield 30C flanked by two outer, right and left, subfields 30R, 30L, and for splitting the field of view of the horizontal imager 32 into a plurality of subfields of view, again a center subfield 32C flanked by two outer, right and left, subfields 32R, 32L. These various subfields outside of the windows 20, 22 are shown in FIG. 13.

The optical system has a plurality of fold minors each positioned in each of the first and second optical paths to fold the captured return light in the subfields of view. As shown in FIGS. 3-4, a first plurality of fold minors 40, 41, 42, 43 and 44 are positioned along a first optical path part between the vertical imager 30 and the upright window 22 to fold the captured return light in the outer subfield 30L to successively reflect off minors 44, 43, 42, 41 and 40, in that order, prior to being focused by the imaging lens assembly 34 onto the vertical imager 30. In analogous manner, a second plurality of fold minors 40, 45, 46, 47 and 48 are positioned along a second optical path part between the vertical imager 30 and the upright window 22 to fold the captured return light in the outer subfield 30R to successively reflect off minors 48, 47, 46, 45 and 40, in that order, prior to being focused by the imaging lens assembly 34 onto the vertical imager 30. A third plurality of fold minors 40, 49 and 50 are positioned along a third optical path part between the vertical imager 30 and the upright window 22 to fold the captured return light in the center subfield 30C to successively reflect off mirrors 50, 49 and 40, in that order, prior to being focused by the imaging lens assembly 34 onto the vertical imager 30.

Figure 5:
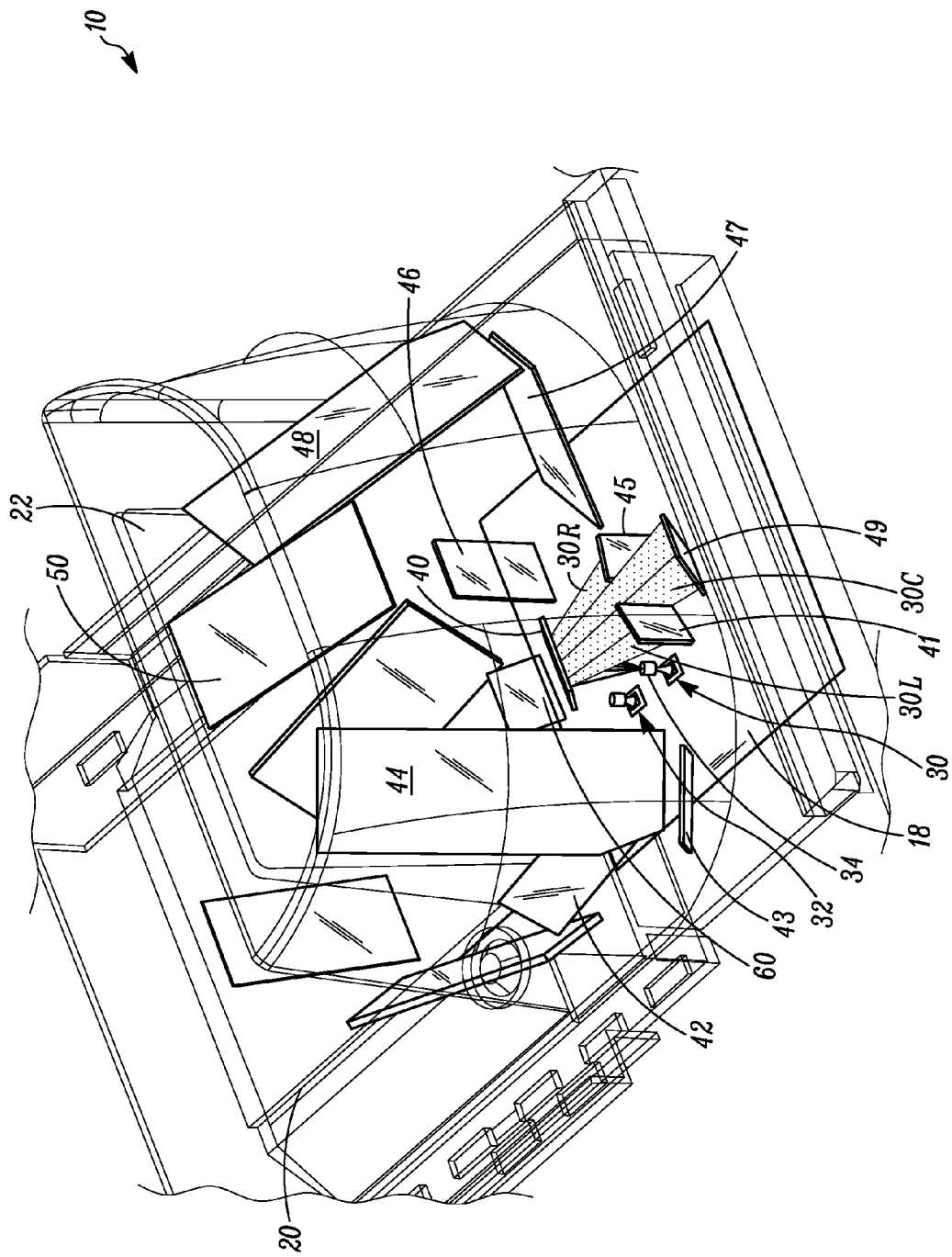
FIG. 5 is a rear perspective view of the optical system part of FIG. 3 depicting an optical splitter for splitting the field of view of the imager into a central subfield of view flanked by two outer subfields of view.
Figure 6:
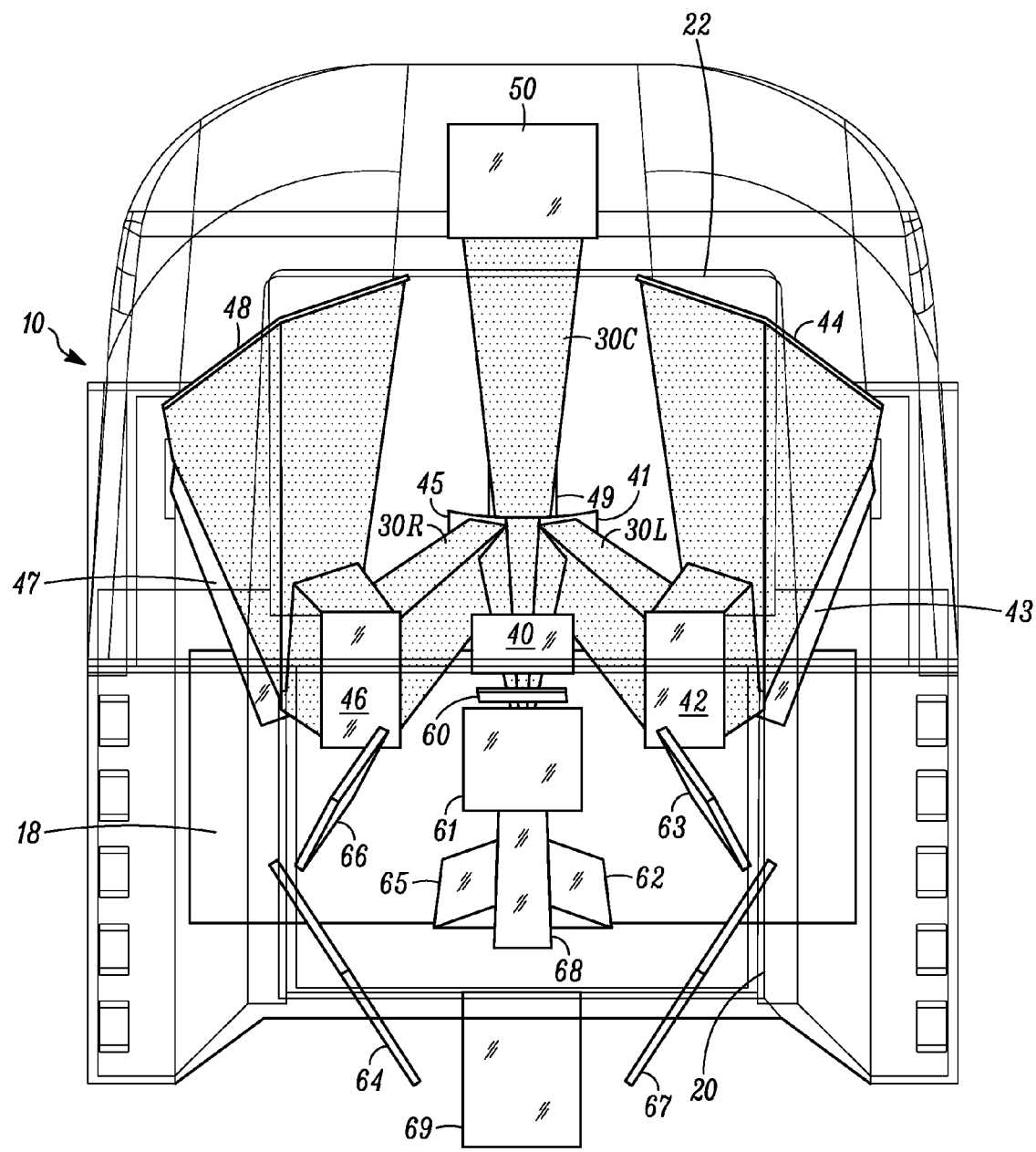
FIG. 6 is a top plan view of the optical system part of FIG. 3 diagrammatically depicting the subfields downstream of the optical splitter.
Figure 7:
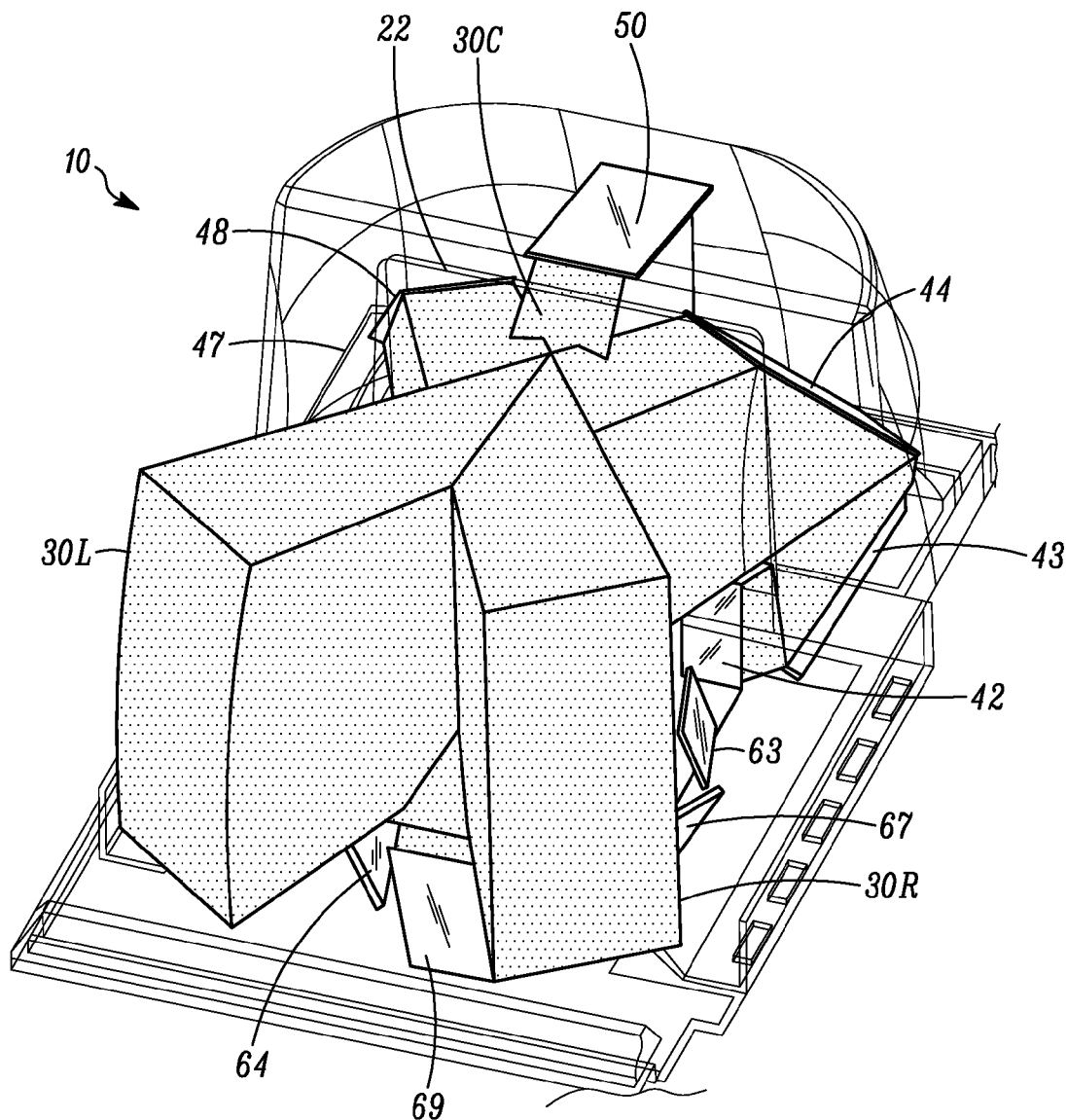
FIG. 7 is a perspective view of the optical system part of FIG. 3 diagrammatically depicting three subfields exteriorly of the upright window of the workstation of FIG. 1.

The aforementioned mirrors 41, 45 and 49, as best seen in FIG. 5, comprise a first optical splitter, wherein the minor 49 splits a central part of the field of view of the vertical imager 30 into the center subfield 30C, wherein the minor 41 splits an outer part of the field of view of the vertical imager 30 into the outer subfield 30L, and wherein the mirror 45 splits another outer part of the field of view of the vertical imager 30 into the outer subfield 30R. FIG. 6 best depicts, as seen from above, the separate passage and folding of the outer subfield 30L between the mirrors 44, 43, 42, 41 and 40, as seen from above, and also depicts the separate passage and folding of the outer subfield 30R between the mirrors 48, 47, 46, 45 and 40. FIG. 7 best depicts the separate passage and folding of the outer subfield 30L through the upright window 22 and onto the minor 44, and the separate passage and folding of the outer subfield 30R through the upright window 22 and onto the minor 48.

As mentioned above, at least some of the known subfields of the prior art are twisted or skewed relative to the windows 20, 22 through which they pass. As a result, peripheral portions of each twisted subfield are clipped and blocked by workstation walls bounding the windows 20, 22. To minimize, if not substantially eliminate, such clipping, the fold mirrors 40, 41, 42, 43 and 44 that are located in the first optical path part of the outer subfield 30L; the fold minors 40, 45, 46, 47 and 48 that are located in the second optical path part of the outer subfield 30R; and the fold minors 40, 49 and 50 that are located in the third optical path part of the central subfield 30C are deliberately positioned and oriented relative to the row or column axes of the vertical imager 30. Specifically, each such fold mirror 40, 41, 42, 43, 44, 45, 46, 47, 48, 49 and 50 has mutually orthogonal mirror axes extending along the height and height of each mirror. Each such fold mirror is oriented such that one of its minor axes is substantially parallel to one of the row or column axes projected onto that minor. Thus, each such fold mirror folds the captured return light along its travel between the indicia and the vertical imager 30 so that each subfield 30C, 30L and 30R passes unskewed through the upright window 22 at a distance from, and generally parallel to, linear edges of the upright window 22. Thus, as best seen in FIGS. 7 and 13 more of each unskewed subfield 30C, 30L and 30R passes through, and more fully fits, the upright window 22.

The above discussion for FIGS. 3-7 dealt with the various fold minors of the optical system for folding and splitting the unskewed subfields 30C, 30L and 30R between the upright window 22 and the vertical imager 30. The following discussion of FIGS. 8-12 deals with additional fold minors of the optical system for folding and splitting additional unskewed subfields 32C, 32L and 32R between the horizontal window 20 and the horizontal imager 32.

Figure 8:
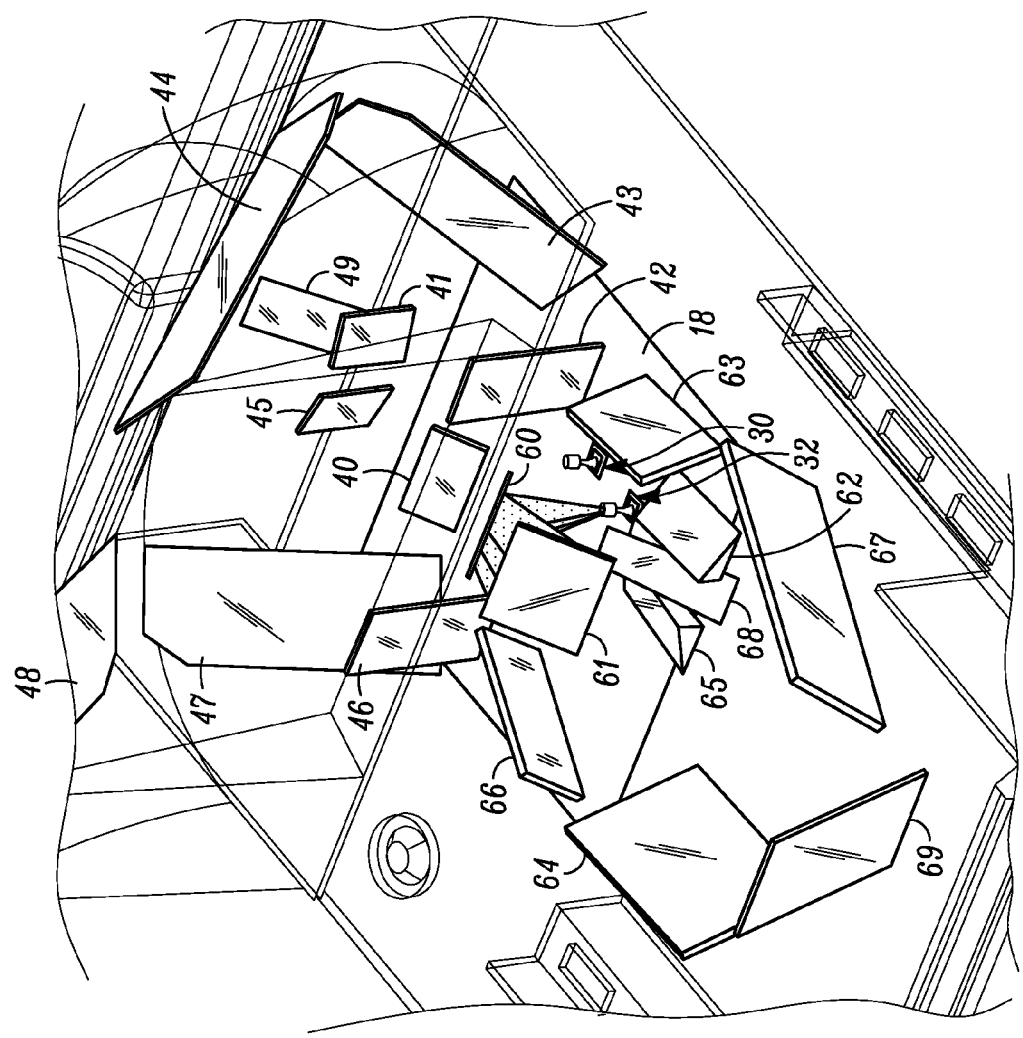
FIG. 8 is a broken-away, enlarged, perspective view of another part of the optical system in the workstation of FIG. 1 diagrammatically depicting part of another folded optical path of the field of view of another imager prior to reaching another optical splitter.
Figure 9:
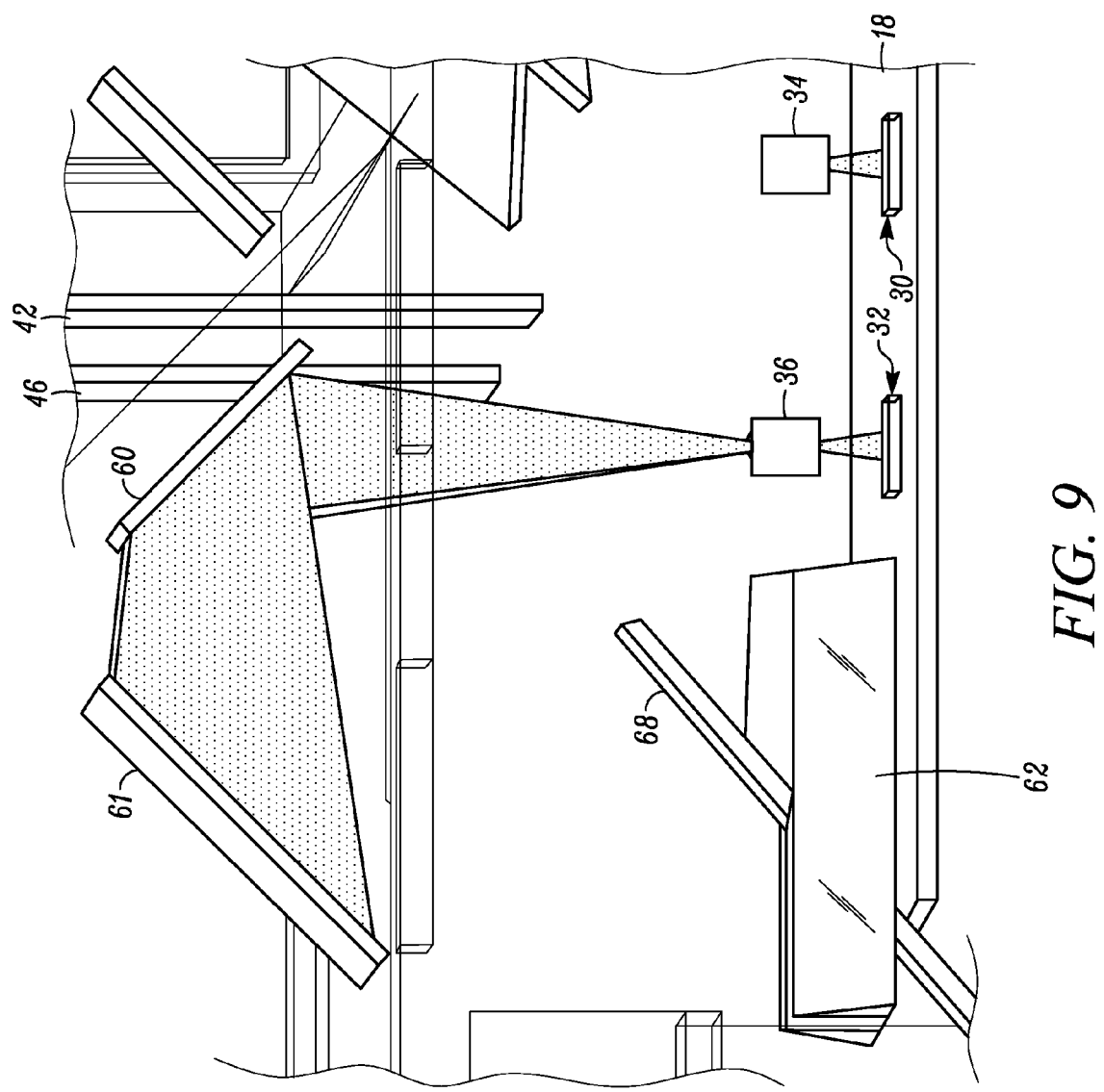
FIG. 9 is a side perspective, enlarged, view of the optical path part of FIG. 8.

Thus, the optical system, as best shown in FIGS. 8-9, includes a fourth plurality of fold minors 60, 61, 62, 63 and 64 that are positioned along a first optical path part between the horizontal imager 32 and the horizontal window 20 to fold the captured return light in the outer subfield 32R to successively reflect off mirrors 64, 63, 62, 61 and 60, in that order, prior to being focused by the imaging lens assembly 36 onto the horizontal imager 32. In analogous manner, a fifth plurality of fold mirrors 60, 61, 65, 66 and 67 are positioned along a second optical path part between the horizontal imager 32 and the horizontal window 20 to fold the captured return light in the outer subfield 32L to successively reflect off mirrors 67, 66, 65, 61 and 60, in that order, prior to being focused by the imaging lens assembly 36 onto the horizontal imager 32. A sixth plurality of fold mirrors 60, 61, 68 and 69 are positioned along a third optical path part between the horizontal imager 32 and the horizontal window 20 to fold the captured return light in the center subfield 32C to successively reflect off mirrors 69, 68, 61 and 60, in that order, prior to being focused by the imaging lens assembly 36 onto the horizontal imager 32.

Figure 10:
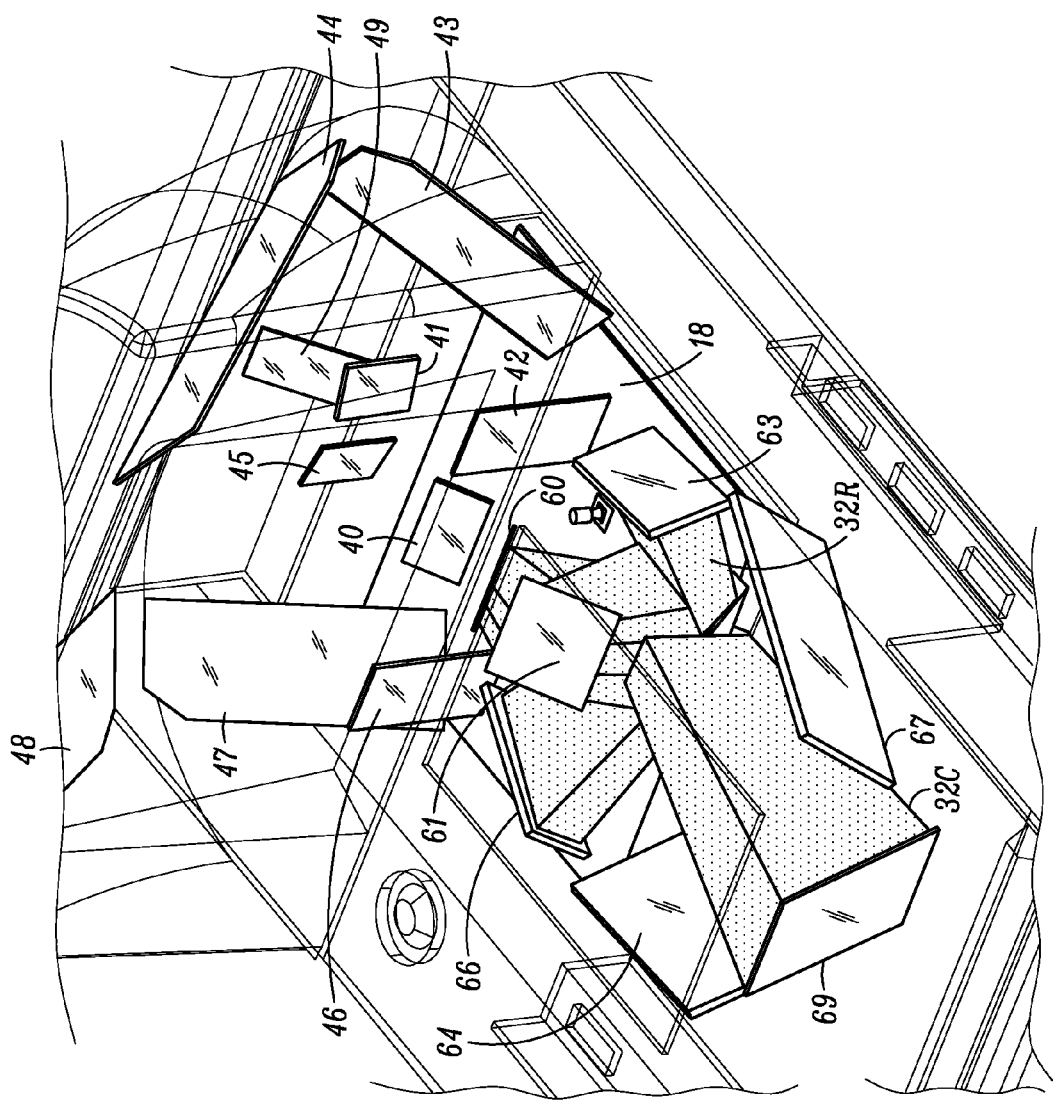
FIG. 10 is a perspective view diagrammatically depicting the subfields downstream of the optical splitter of FIG. 8.
Figure 11:
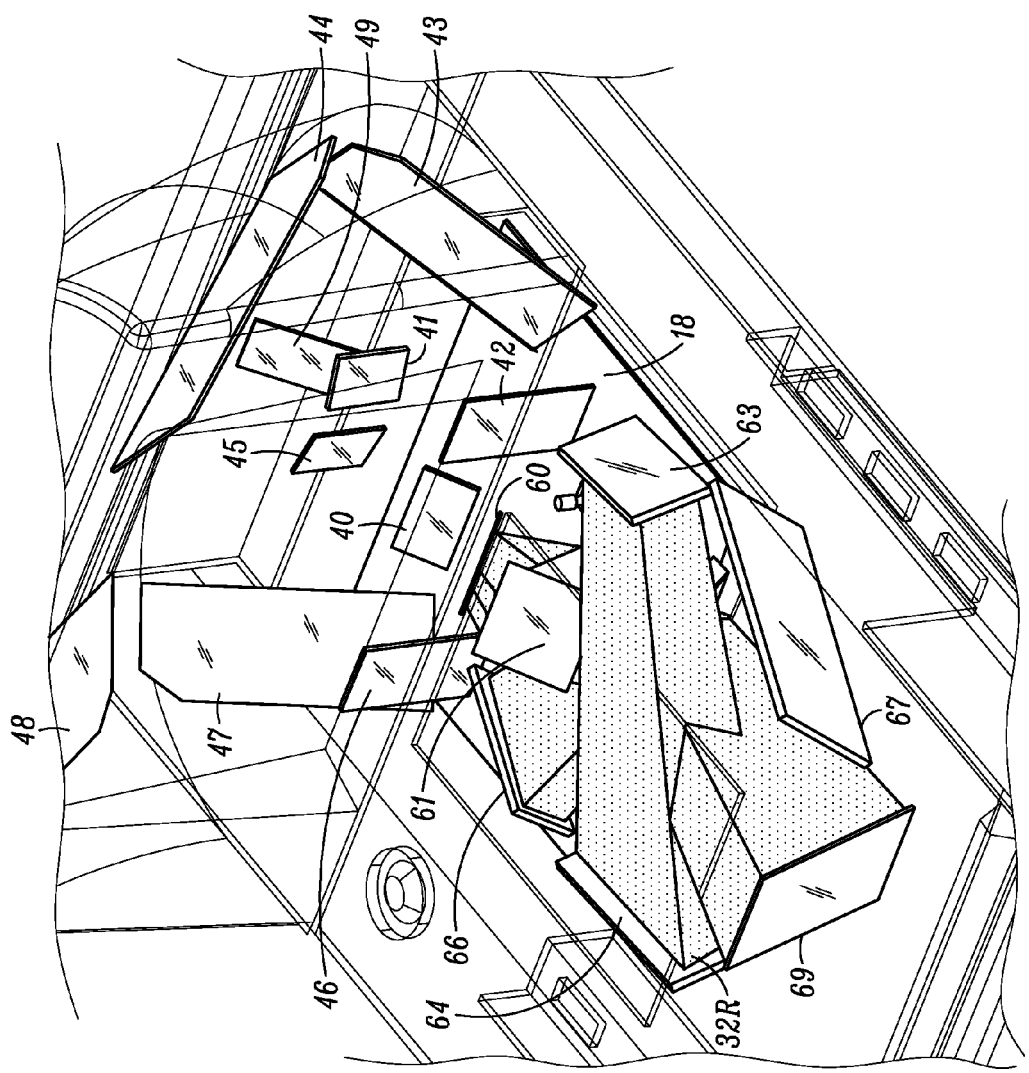
FIG. 11 is a perspective view diagrammatically depicting the subfields still further downstream of the optical splitter of FIG. 8.
Figure 12:
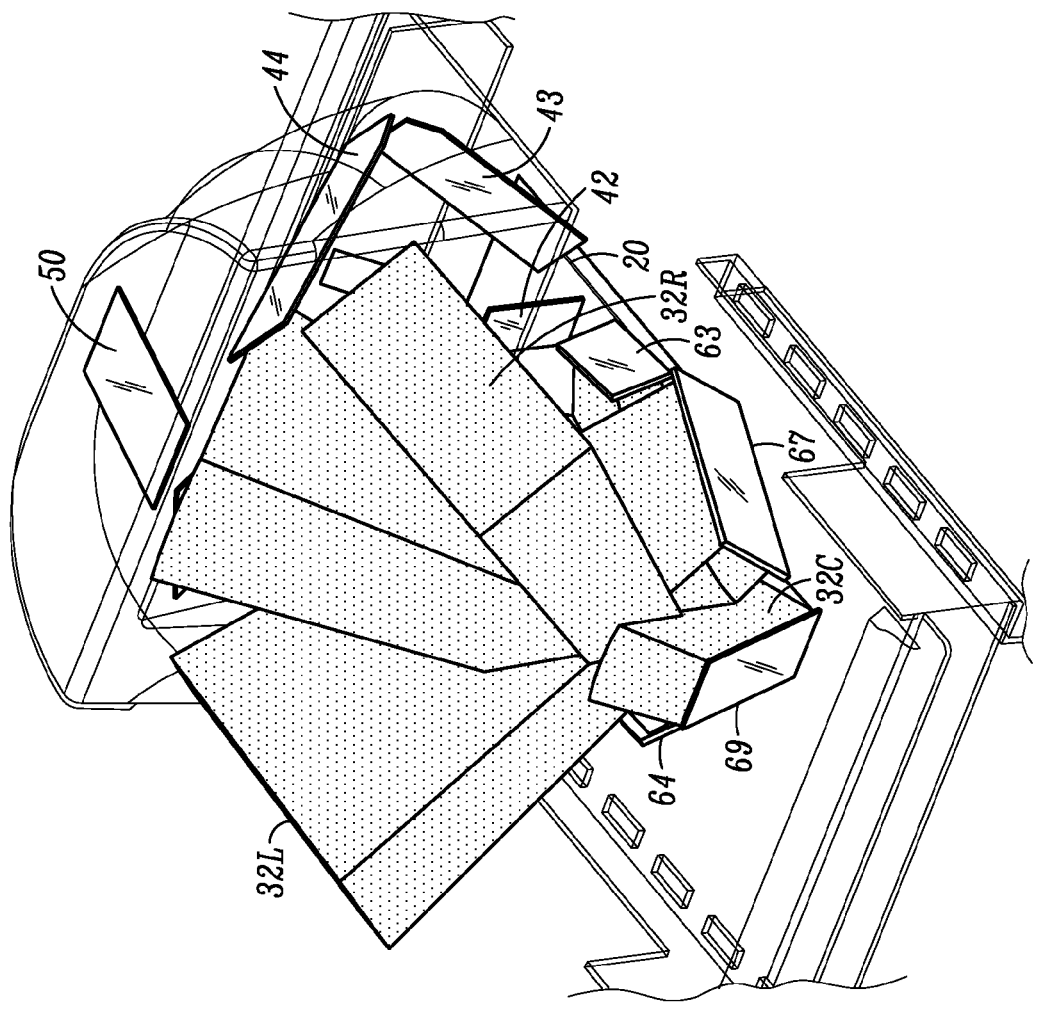
FIG. 12 is a perspective view of the other optical system part of FIG. 8 diagrammatically depicting three subfields exteriorly of the horizontal window of the workstation of FIG. 1.

The aforementioned mirrors 62, 65 and 68, as best seen in FIG. 8, comprise a second optical splitter, wherein the mirror 68 splits a central part of the field of view of the horizontal imager 32 into the center subfield 32C, wherein the mirror 62 splits an outer part of the field of view of the horizontal imager 32 into the outer subfield 32R, and wherein the mirror 65 splits another outer part of the field of view of the horizontal imager 32 into the outer subfield 32L. FIG. 9 best depicts the folding of all three subfields between the mirrors 61 and 60 and the horizontal imager 32 away from the second optical splitter 62, 65 and 68. FIG. 10 best depicts the separate passage and folding of the outer subfield 32R between the mirrors 62 and 63, and also depicts the separate passage and folding of the outer subfield 32L between the mirrors 45 and 66, and also depicts the separate passage and folding of the central subfield 32C between the mirrors 68 and 69. FIG. 11 best depicts the separate passage and folding of the outer subfield 32R between the mirrors 63 and 64; in analogous manner, it will be understood that the outer subfield 32L passes between the mirrors 66 and 67 (not illustrated so as not to encumber the drawing). FIG. 12 best depicts the separate passage and folding of the outer subfield 32R through the horizontal window 20 and onto the mirror 64, and the separate passage and folding of the outer subfield 32L through the horizontal window 20 and onto the mirror 67, and the separate passage and folding of the central subfield 32C through the horizontal window 20 and onto the mirror 69.

As mentioned above, to minimize, if not substantially eliminate, clipping of the subfields 32C, 32L and 32R as they pass through the horizontal window 20, the fold mirrors 60, 61, 68 and 69 that are located in the third optical path part of the central subfield 32C are deliberately positioned and oriented relative to the row or column axes of the horizontal imager 32. Specifically, each such fold mirror 60, 61, 68 and 69 has mutually orthogonal mirror axes extending along the height and height of each mirror. Each such fold mirror is oriented such that one of its mirror axes is substantially parallel to one of the row or column axes projected onto that mirror. Thus, each such fold mirror folds the captured return light along its travel between the indicia and the horizontal imager 30 so that the subfield 32C passes unskewed through the horizontal window 20 at a distance from, and generally parallel to, linear edges of the horizontal window 20.

As for the other subfields 32R and 32L, there is not enough space in the housing 16 to fold the subfields 32R and 32L parallel to the array axes as was done with the subfield 32C. Hence, the subfields 32R and 32L are rotated using compound angles for the outer two mirrors 62, 65 of the second optical splitter. These mirrors 62, 65 introduce twist which is counteracted by compound angles in the opposite direction by the fold mirrors 63, 64 and 66, 67 further down the optical path towards the horizontal window 20. By the time the subfields 32R and 32L exit the horizontal window 20, the twist is almost entirely eliminated. Thus, as best seen in FIG. 13, more of each unskewed subfield 32C, 32L and 32R passes through, and more fully fits, the horizontal window 20.

Thus, only two imagers 30, 32 are needed to produce six subfields. These six subfields provide optimum visibility of indicia on various sides of a product being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users. If a user should present a product in an unusual way, however, such as by positioning the indicia opposite one of the windows, a subfield will still be positioned to read that indicia.

It will be appreciated that at least one of the fold mirrors is located in the optical path between each imager and each optical splitter. Thus, the fold mirror 40 is located in the optical path between the vertical imager 30 and the first optical splitter 41, 45 and 49; and the fold mirrors 60, 61 are located in the optical path between the horizontal imager 32 and the second optical splitter 62, 65 and 68. In a preferred embodiment, each imager 30, 32 is spaced along the optical path at a predetermined distance, e.g., about 400 mm, away from its associated window 22, 20, and each optical splitter is located at least one-fifth of the predetermined distance away from its associated imager. Thus, each optical splitter is positioned remotely from its associated imager. As described above, this remote positioning of the splitter relaxes the prior art requirement of high positioning accuracy and provides a sharper delineation between the subfields being split, thereby increasing the number of sensors available to resolve indicia located in the scan zone.

As previously mentioned, the windows 20, 22 are differently positioned and differently sized. By way of numerical example, the generally horizontal window 20 in a conventional bi-optical workstation lies in a horizontal plane and measures about four inches in width by about six inches in length, while the generally upright window 22 generally lies in a tilted plane and measures about six inches in width by about eight inches in length. This in part led to the prior art use of imaging lens assemblies with different optical powers and different focal points at different distances away from the windows 20, 22.

Another aspect of this invention resides in providing both imaging lens assemblies 34, 36 of the two imagers 30, 32 with substantially the same optical power (preferably not anamorphic), and in spacing the imagers 30, 32 at substantially the same, long predetermined distance, e.g., about 400 mm, away from their associated windows 22, 20. Preferably, the optical path parts of each of the subfields 30C, 30R, 30L, 32C, 32R and 32L are about the same between their respective window and their respective imager. Achieving such a long optical path by the use of a plurality of the folded mirrors allows the use of a minimum number of sensors. The longer the optical path, the narrower the divergence angle of a subfield can be, while still achieving the required subfield size at the window. Since the divergence angle is narrow, the subfield does not grow quickly beyond the window, thereby extending the working range over which sensor resolution is adequate.

In use, an operator, such as a person working at a supermarket checkout counter, or a customer in a self checkout stand, processes the product 12 bearing the UPC symbol 14 thereon, past the windows 20, 22 by swiping the product 12 across a respective window, or by presenting the product 12 at the respective window. The symbol 14 may located on any of the top, bottom, right, left, front and rear, sides of the product 12, and at least one, or perhaps both, of the imagers 30, 32 will capture the illumination light reflected, scattered, or otherwise returning from the symbol 14 through one or both windows 20, 22. All three of the subfields 32C, 32R and 32L pass through the horizontal window 20 along different intersecting directions to read three sides of the product. All three of the subfields 30C, 30R and 30L pass through the upright window 22 along different intersecting directions to read three more sides of the product. As shown in FIG. 13, the six subfields substantially fully occupy the scan zone. As a result, any dead areas in the scan zone in which indicia 14 cannot be read are significantly minimized.

It will be understood that each of the elements described above, or two or more together, also may find a useful application in other types of constructions differing from the types described above.

While the invention has been illustrated and described as embodied in a point-of transaction workstation for electro-optically reading indicia by using two imagers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A point-of-transaction workstation for processing products by electro-optically imaging indicia associated with the products, comprising:
    a housing;
    at least two substantially orthogonal window one window supported by the housing;
    at least two solid state imagers supported by the housing and each of the two solid state imagers are operative to capture return light from the indicia through a corresponding one of said solid state imager over a field of view, the at least two imagers each having an array of sensors arranged along mutually perpendicular row and column array axes to each other;
    an optical system supported by the housing and operative for directing the captured return light along an optical path from each of the at least two windows to each corresponding solid state imager, and for splitting the field of view of the at least two solid state imagers into a plurality of corresponding subfields of view, the optical system having a plurality of fold mirrors each positioned in the optical path to fold the captured return light in at least one of the subfields of view about a respective rotating axis, wherein the respective rotating axis of each given fold mirror selected from the plurality of fold mirrors in the optical path is substantially parallel to a projected array direction defined as one of the row or column array axes in the at least one imager projected backward onto said given fold mirror through all intervening fold mirrors in the optical path between said given fold mirror and the at least one imager, wherein the positioning of the fold mirrors is chosen to result in a resistance of skewing of the at least one subfield of view relative to each of the at least two windows; and
    a controller for controlling the at least two imagers and operable to process the captured return light in the at least one subfield of view and to decode the indicia.

2. The workstation of claim 1, wherein the at least one window is located in a generally horizontal plane; and further comprising another window located in a generally upright plane that intersects the generally horizontal plane, and another solid-state imager supported by the housing for capturing return light from the indicia through the other window over another field of view and having an array of sensors arranged along mutually perpendicular array axes, and a printed circuit board on which the arrays of both imagers are commonly mounted.

3. The workstation of claim 2, wherein the optical system includes a first optical splitter for splitting the field of view of the at least one imager into three subfields of view that pass through the one window, and a second optical splitter for splitting the other field of view of the other imager into three subfields of view that pass through the other window; and wherein at least one of the fold mirrors is located in the optical path between the at least one imager and the first optical splitter, and wherein at least another of the fold mirrors is located in the optical path between the other imager and the second optical splitter.

4. The workstation of claim 3, wherein each array faces upwardly toward the generally horizontal plane; wherein the at least one fold mirror is located above the at least one imager; and wherein the at least other fold mirror is located above the other imager.

5. The workstation of claim 3, wherein the at least one imager is spaced along the optical path at a first distance away from the at least one window, and wherein the first optical splitter is located at least one-fifth of the first distance away from the at least one imager; and wherein the other imager is spaced along the optical path at a second distance away from the other window, and wherein the second optical splitter is located at least one-fifth of the second distance away from the other imager.

6. The workstation of claim 3, wherein each window has linear edges; and wherein the optical system directs the subfields to pass through each window at a distance from, and generally parallel to, the linear edges of each window.

7. The workstation of claim 3, wherein the first optical splitter includes a central splitting mirror for forming a central subfield, and two outer splitting mirrors for forming two outer subfields that flank the central subfield; wherein the central splitting mirror folds the captured return light in the central subfield about a mirror axis substantially parallel to one of the array axes of the at least one imager projected onto the central splitting mirror to resist skewing of the central subfield relative to the at least one window; and wherein the outer splitting mirrors are tilted to rotate and unscrew the outer subfields relative to the at least one window.

8. The workstation of claim 3, wherein the second optical splitter includes three splitting mirrors for splitting the other field of view into a central subfield and two outer subfields that flank the central subfield, and wherein each splitting mirror folds the captured return light in the central subfield about a mirror axis substantially parallel to one of the array axes of the other imager projected onto the respective splitting mirror to resist skewing of each subfield relative to the other window.

9. The workstation of claim 2, wherein the optical system directs the captured return light from the at least one window to the at least one imager along a first optical path portion, and also directs the captured return light from the other window to the other imager along a second optical path portion that substantially equals the first optical path portion in length.

10. The workstation of claim 2, wherein both imagers have imaging lens assemblies of substantially the same optical power.

11. A method of processing products by electro-optically imaging indicia associated with the products, the method comprising the steps of:
supporting at least two substantially orthogonal windows by a housing;
capturing return light from the indicia through the at least two windows over a corresponding field of view of each of said two solid state imagers each having an array of sensors arranged along mutually perpendicular row and column array axes;
directing the captured return light along an optical path from each of the at least two windows to each corresponding solid state imagers;
splitting the field of view of the at least two solid state imagers into a plurality of corresponding subfields of view;
positioning each of a plurality of fold mirrors in the optical path to fold the captured return light in at least one of the subfields of view about a respective rotating axis, wherein the respective rotating axis of each given fold mirror selected from the plurality of fold mirrors in the optical path is substantially parallel to a projected array direction defined as one of the row or column array axes in the at least one imager projected backward onto said given fold mirror through all intervening fold mirrors in the optical path between said given fold mirror and the at least one imager to resist skewing of the at least one subfield of view relative to the at least one window; and
controlling the at least one imager, and processing the captured return light in the at least one subfield of view and decoding the indicia.

12. The method of claim 11, wherein the at least one window is located in a generally horizontal plane; and locating another window in a generally upright plane that intersects the generally horizontal plane, and capturing return light from the indicia through the other window over another field of view of another solid-state imager having an array of sensors arranged along mutually perpendicular array axes, and commonly mounting the arrays of both imagers on a printed circuit board.

13. The method of claim 12, wherein the splitting step is performed by a first optical splitter for splitting the field of view of the at least one imager into three subfields of view that pass through the one window, and by a second optical splitter for splitting the other field of view of the other imager into three subfields of view that pass through the other window; and locating at least one of the fold mirrors in the optical path between the at least one imager and the first optical splitter, and locating at least another of the fold mirrors in the optical path between the other imager and the second optical splitter.

14. The method of claim 13, and configuring each array to face upwardly toward the generally horizontal plane; and locating the at least one fold mirror above the at least one imager; and locating the at least other fold mirror above the other imager.

15. The method of claim 13, and spacing the at least one imager along the optical path at a first distance away from the at least one window, and locating the first optical splitter at least one-fifth of the first distance away from the at least one imager; and spacing the other imager along the optical path at a second distance away from the other window, and locating the second optical splitter at least one-fifth of the second distance away from the other imager.

16. The method of claim 13, and configuring each window with linear edges; and directing the subfields to pass through each window at a distance from, and generally parallel to, the linear edges of each window.

17. The method of claim 13, and configuring the first optical splitter with a central splitting mirror for forming a central subfield, and with two outer splitting mirrors for forming two outer subfields that flank the central subfield; wherein the central splitting mirror folds the captured return light in the central subfield about a mirror axis substantially parallel to one of the array axes of the at least one imager projected onto the central splitting mirror to resist skewing of the central subfield relative to the at least one window; and tilting the outer splitting mirrors to rotate and unskew the outer subfields relative to the at least one window.

18. The method of claim 13, and configuring the second optical splitter with three splitting mirrors for splitting the other field of view into a central subfield and two outer subfields that flank the central subfield, and wherein each splitting mirror folds the captured return light in the central subfield about a mirror axis substantially parallel to one of the array axes of the other imager projected onto the respective splitting mirror to resist skewing of each subfield relative to the other window.

19. The method of claim 12, and directing the captured return light from the at least one window to the at least one imager along a first optical path portion, and also directing the captured return light from the other window to the other imager along a second optical path portion that substantially equals the first optical path portion in length.

20. The method of claim 12, and configuring both imagers with imaging lens assemblies of substantially the same optical power.

* * * * *